(12) United States Patent
Bugnet et al.

(10) Patent No.: US 7,300,721 B2
(45) Date of Patent: Nov. 27, 2007

(54) ALKALINE SECONDARY ELECTROCHEMICAL GENERATORS WITH A ZINC ANODE

(75) Inventors: Bernard Bugnet, Le Plessis Trevise (FR); Denis Doniat, Paris (FR); Robert Rouget, Paris (FR)

(73) Assignee: S.C.P.S. Societe de Conseil et de Prospective Scientifique S.A., Rosny-Sous-Bois (FR)

( * ) Notice: Subject to any disclaimer, the term of this patent is extended or adjusted under 35 U.S.C. 154(b) by 0 days.

(21) Appl. No.: 10/770,771

(22) Filed: Feb. 3, 2004

(65) Prior Publication Data

US 2004/0166412 A1    Aug. 26, 2004

Related U.S. Application Data

(63) Continuation of application No. PCT/IB02/03155, filed on Aug. 5, 2002.

(30) Foreign Application Priority Data

| Aug. 3, 2001 | (FR) | ................................ 01 10488 |
| Apr. 5, 2002 | (FR) | ................................ 02 04379 |

(51) Int. Cl.
*H01M 4/42* (2006.01)

(52) U.S. Cl. .................. 429/229; 429/231; 429/218.1; 429/206; 252/182.1

(58) Field of Classification Search ................ 429/229, 429/231, 218.1, 206; 252/182.1
See application file for complete search history.

(56) References Cited

U.S. PATENT DOCUMENTS

| 2,994,625 | A | 8/1961 | Mendelsohn et al. |
| 3,476,601 | A | 11/1969 | Berger et al. |
| 4,041,221 | A | 8/1977 | Berchielli et al. |
| 4,332,871 | A | 6/1982 | Charkey |

FOREIGN PATENT DOCUMENTS

| DE | 195 46 333 | * | 6/1996 |
| DE | 195 46333 | | 6/1996 |
| FR | 2788 887 | | 7/2000 |
| JP | 06283194 | | 7/1994 |
| JP | 2000133302 | | 12/2000 |
| WO | WO 00/79622 | | 12/2000 |

OTHER PUBLICATIONS

19 Pages, K Bass et al article entitled "Methods for the Reduction of Shape Change and Dendritic Growth in Zinc-Based Secondary Cells" from Journal of Power Sources, vol. 35, No. 3 (1991).
20 Pages, Frank R. McLarnon et al article entitled "The Secondary Alkaline Zinc Electrode" from 1046 Journal of the Electrochemical Society 138 Feb. (1990) No. 2, Manchester, NY.

* cited by examiner

*Primary Examiner*—Laura Weiner
(74) *Attorney, Agent, or Firm*—Sturm & Fix LLP

(57) ABSTRACT

The invention relates to secondary alkaline electrochemical generators with a zinc anode in an electrolyte, the active mass of said anode comprising at least one conductive ceramic. According to the invention, the electrolyte of the generator is made up of a highly-concentrated alkaline solution and/or the active mass of the zinc anode contains an additive comprising at least one alkaline titanate having general formula $(M_2O)_n(Ti)_2)_m xH_2O$, wherein M denotes Li, Na, K, Rb or Cs, n being between 0.5 and 2, m being between 1 and 10 and x being between 0 and 10, or alkaline earth having general formula $(MO)_n(TiO_2)_m xH_2O$, wherein M denotes Mg, Ca, Sr or Ba, n being between 1 and 5, m being between 1 and 10 and x being between 0 and 10. The invention also relates to the zinc anode of the generators used in the invention and the production method thereof.

26 Claims, No Drawings

ALKALINE SECONDARY ELECTROCHEMICAL GENERATORS WITH A ZINC ANODE

CROSS REFERENCE TO RELATED APPLICATIONS

This application is a Continuation application of PCT/IB02/03155 filed Aug. 5, 2002, which claimed priority of French Application Nos. 0110488 filed Aug. 3, 2001 and 0204379 filed Apr. 5, 2002, entitled "Secondary Alkaline Electrochemical Generators With a Zinc Anode" all of which are included in their entirety by reference made hereto.

BACKGROUND OF THE INVENTION

1. Field of the Invention

The present invention relates to alkaline secondary electrochemical generators with a zinc anode, the active mass of the anode comprising at least one conducting ceramic material. According to the invention, the electrolyte of the generator consists of a highly concentrated alkaline solution and/or the active mass of the zinc anode contains an additive consisting of at least one alkali metal or alkaline earth metal titanate. The invention also relates to the zinc anode of the generators according to the invention as well as its production process.

The present invention relates to the field of electrochemical generators, and more particularly to the field of storage batteries.

The invention relates especially to secondary generators with a zinc anode and is intended to achieve a high level of cyclability of the zinc electrode.

2. Description of the Related Art

Zinc electrodes are well known to the person skilled in the art on account of their high performance. They may furthermore be employed in various secondary electro-chemical systems such as air-zinc, nickel-zinc and silver-zinc alkaline generators, and bromine-zinc and chlorine-zinc generators with saline electrolytes.

Zinc is an attractive anodic active material, having a highly negative redox potential of −1.25 V/NHE (Normal Hydrogen Electrode) for the pair $Zn/Zn(OH)_2$. Zinc electrodes offer a theoretical mass capacity of 820 Ah/kg. They also for example enable theoretical mass energies of 334 Wh/kg for the pair nickel-zinc (NiZn) and of 1,320 Wh/kg for the pair zinc-oxygen to be obtained. For the Ni/Zn battery, the practical mass energy is normally between about 50 and 80 Wh/kg, the voltage however being 1.65 volts instead of 1.2 volts for the other alkaline systems.

Advantages of zinc that may be emphasised include on the one hand its non-toxic nature as regards the environment (production, use and disposal), and on the other hand its low cost, which is very much less than that of the other anodic materials of alkaline batteries (cadmium and metallic hydrides) or of lithium batteries.

However, the industrial development of rechargeable systems using zinc electrodes has encountered a serious difficulty, namely the inadequate lifetime during cycling.

The reactions that take place at the anode are the following in the case of an alkaline battery:

⇐ charge

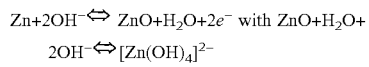

discharge ⇒

It is generally the case that the recharging of a zinc electrode from its oxides and hydroxides and zincates leads to the formation of deposits whose structure is modified with respect to their original form, and are often dendritic, spongy or pulverulent. This phenomenon occurs moreover in a very large range of current densities.

Dendritic-type deposits rapidly lead to zinc being forced through the separators and to short-circuiting with the electrodes of opposite polarity.

As regards deposits of a pulverulent or spongy type, they do not allow the reconstitution of electrodes capable of functioning in a satisfactory and durable manner, since the adherence of the active material is unsatisfactory.

In addition, the chemical reduction of oxides, hydroxides and zincates to zinc at the anode during the recharging phases is also characterised by morphological changes in the electrode itself. Depending on the modes of functioning of the batteries, various types of modifications in form of the anode are found, due to a phenomenon of non-uniform redistribution of the zinc during its formation. This may be reflected in particular by a harmful densification of the anodic active mass at the surface of the electrode, most commonly in its central zone. At the same time there is generally a reduction in the porosity of the electrode, which helps to accelerate the preferential formation of zinc at its surface.

These major drawbacks, which reduce the number of cycles that can be performed to just a few dozen—an insufficient number for a secondary system to be of economic interest—have led to very many attempts aimed at improving the deposition characteristics of the zinc during recharging, so as to raise the number of charging-discharging cycles that the generator can withstand.

Widely varying methods have been investigated so as to try and minimise or retard for as long as possible these formation defects of the zinc. Among these methods, the following may in particular be highlighted:

"Mechanical" methods aimed at reducing the dendritic formation or build-up, or of avoiding pulverulent deposits: circulation of the electrolyte and/or zinc electrode in dispersed form; subjecting the electrodes to vibrations; use of separators resistant to perforation by the dendrites, often in multiple layers, and even of ion-exchange membranes in order to prevent the migration of zincates;

"Electrical methods" intended to improve the conditions of formation of the zinc deposit: monitoring of the charging parameters (intensity, voltage, etc.); use of pulsed currents, including current inversions in order to try and dissolve the dendrites during formation;

"Chemical" and "electrochemical" methods: use of additives incorporated in the electrolyte (fluoride, carbonate, etc.) and/or in the anodic active material (calcium, barium, etc.) and dilution of the electrolyte so as in particular to limit the solubility of the zincates and to form zinc oxide and insoluble zinc compounds.

These various techniques may be employed individually or in combination.

Their positive effects are in any case limited and are often found to be insufficient to confer any economic viability on secondary generators with zinc anodes, and in particular on the pair NiZn, which however is theoretically very attractive; they scarcely enable for example one hundred cycles carried out at discharging levels that are significant to be exceeded or even attained.

These techniques furthermore in some cases have serious negative effects, such as:
- increase in internal resistance of the battery (due to certain additive or to the dilution of the electrolyte),
- reduction in the lifetime of nickel cathodes (due to the use of certain additives),
- mechanical complexity of functioning (for systems involving circulation),
- increases in volume and mass of the systems (deterioration of the specific technical performance in terms of mass and volume energies),
- increase in cost (loss of potential economic advantage).

A major innovation was provided and described by the invention disclosed in French patent application FR 2.788.887, the elaborated technology enabling several hundreds of cycles to be performed in a large range of operating regimes and up to very high discharging levels, by virtue of the use of means intended to increase the utilisation factor of the active material by improving the percolation of the charges within it.

SUMMARY OF THE INVENTION

The present invention is based on the observation that an insufficient drainage of the charges within the active material helps to promote the formation of the zinc deposit during the rechargings, at sites that represent only a limited proportion of the whole of the active mass. This growth in zinc thus takes place starting from sites having a limited total surface area with respect to the overall developed surface of the anodic material, this phenomenon being manifested in most cases by a dendritic nature of the deposit, or by the densification of the latter. The technology described in the document mentioned above shows that this mechanism may be greatly reduced if the same total quantity of zinc is deposited on a much larger surface, by increasing the sites of formation of the deposit, in the whole volume of the electrode.

According to a preferred embodiment this technology involves the use, within the zinc anode, of a double or triple level of electrical collector:
- a principal collector network: an electrode support of the "metallic foam" type (reticulated alveolar structure),
- a secondary conductor network: a dispersion of chemically inert conducting ceramic particles in the storage battery,
- a possible supplementary tertiary conductor network: a dispersion of bismuth in the anodic active mass.

An "antipolar mass" that may consist of nickel hydroxide in the case of implementation of nickel-zinc storage batteries, may also be introduced into the zinc anode, and contributes in an original manner to the level of performance that is achieved.

The present invention also aims to increase the cyclability of alkaline secondary electrochemical generators with zinc anodes by improving the quality of the zinc deposit obtained during the recharging. This problem is solved by combining the use of conducting ceramic materials employed as electrical conduction agent within the anodic active mass, and the use of an additive such as described hereinbelow and/or the use of an alkaline electrolyte of suitable concentration that may contain solubilised zinc oxide.

In the "Journal of the Electrochemical Society", Vol. 145, No. 4, April 1988, page 1211, C. F. Windisch et al. describe the change in the nature of the surface of polished discs of titanium nitride immersed for 136 days in a concentrated solution of potassium hydroxide. The authors found that, during the course of anodic polarisation, the titanium nitride is converted into titanates in the course of an oxidation reaction involving release of $O_2$. However, the polarisation values used are very high and apply to supercapacitors in which the accelerated conversion of titanium nitride into titanate is due to an electrochemical phenomenon that does not occur at potential values such as those used in the present invention.

However, it is also apparent that various conducting ceramic materials, and in particular titanium nitride, could be formed by chemical reaction after a prolonged residence time of several weeks in the concentrated alkaline solutions.

This phenomenon is then manifested, particularly in the case of titanium nitride (TiN), by the formation of potassium titanate (in potassium hydroxide solution), or by the formation of sodium titanate (in sodium hydroxide solution), which is present in an hydrated and slightly crystalline form on the surface of the titanium nitride. It is thought that this corrosion is exacerbated in the case of powders, which will have specific surfaces larger than that of a polished plate. It is also thought that this corrosion could be increased in the presence of highly concentrated alkaline solutions.

It is known however that hydrated titanates (in the same way as hydrated titanium oxides) have a capacity for fixing metallic ions, which varies depending on the structure of the titanate and the nature of the fixed ion. This fixation capacity, involving exchange of ions, is used in particular to treat radioactive effluents, including in alkaline medium.

The improvement of the capability of zinc electrodes incorporating conducting ceramic materials according to the description given in document FR 2.788.887 to undergo cycling may thus result not only in an increase in the zinc germination conductor sites, but also in a retention of the zincate ions, which is capable of taking place on the surface of the conducting particles of ceramic material.

However, the use of an electrolyte consisting of a highly concentrated alkaline solution promoting the formation of retention sites for zincate ions runs counter to what is recommended in the literature relating to NiZn storage batteries.

Thus, E. G. Gagnon (Journal of the Electrochemical Society (1986), Vol. 133, No. 10, pp. 1989-1995) has shown that zinc electrodes whose active mass consists of a mixture in which the molar ratio of calcium hydroxide to zinc oxide is between 0.75 and 1 have a better cyclability, assessed with respect to the dendritic growths and to the change in form, if the concentration of electrolyte is 20% by weight of potassium hydroxide (4.2 M). For 9M solutions the author finds major redistributions of the zinc, as well as large amounts of dendritic growths leading to a rapid cessation of the cycling.

Similarly, T. C. Adler, F. R. McLarnon and E. J. Cairns (Journal of the Electrochemical Society (1993), Vol. 140, No. 2, pp. 289-294) show that an electrolyte consisting of 6.8 M potassium hydroxide does not allow a figure of 100 cycles to be exceeded for an NiZn storage battery, and recommend the use of a dilute electrolyte consisting of 3.2 M potassium hydroxide, 1.8 M potassium fluoride and 1.8 M potassium carbonate.

In contrast to this, it is recommended to use in silver-zinc storage batteries employing cellulose (cellophane) membranes as separator, highly concentrated solutions of potassium hydroxide of 35 to 45%, i.e. concentrations between 8.3 and 11.5 M. In fact, cellulose separators hydrolyse in alkaline medium, and reducing the amount of water in the electrolyte can slow down this phenomenon. This high concentration constitutes a specific constraint on this type of AgZn storage batteries, and traditionally restricts their cyclability on account of the changes in the zinc electrode that occur during the cycles, as described hereinbefore, and leads to lifetimes that do not exceed 100 cycles.

The authors of the present patent application consequently carried out a systematic study intended to define the conditions and means capable of promoting an increase in the retention of the zincates within the zinc anode in an alkaline secondary electrochemical generator, in the proximity of the conducting sites, which has led to the use of specific additives, combined or not with the use of electrolytes consisting of highly concentrated alkaline solutions. The authors of the present invention have also discovered that the combined use of an electrolyte consisting of a highly concentrated alkaline solution with zinc anodes comprising conducting ceramic materials was capable of increasing the ability of the electrode to undergo cycling. These aims are the subject of the invention.

The present invention accordingly relates to alkaline secondary electrochemical generators with zinc anodes, the active mass of the anode comprising at least one conducting ceramic material, characterised in that the electrolyte of the generator consists of a highly concentrated alkaline solution and/or the active mass of the zinc anode contains an additive consisting of at least one alkali metal titanate of the general formula $(M_2O)_n(TiO_2)_m xH_2O$ in which M denotes Li, Na, K, Rb or Cs, n is between 0.5 and 2, m is between 1 and 10 and x is between 0 and 10, or alkaline earth metal titanate of the general formula $(MO)_n(TiO_2)_m xH_2O$ in which M denotes Mg, Ca, Sr or Ba, n is between 1 and 5, m is between 1 and 10 and x is between 0 and 10

During the discharging phases of the zinc anode, the metallic zinc is oxidised to insoluble and soluble forms, namely oxides, hydroxides and zincates. These latter, which are soluble, diffuse into the whole volume of the storage battery electrolyte. In order to limit this phenomenon some experts therefore recommend the use of additives such as calcium hydroxide $Ca(OH)_2$, incorporated in the anodic active material or in the electrolyte, that are intended to limit the solubility of the zincates. It can be seen in fact that, since these are distributed throughout the electrolyte, their reduction to metallic zinc during recharging occurs very largely from species that are not found within the porous anode but instead on the exterior of the latter, and thus takes place via the surfaces of the zinc electrode. The deposition then preferentially takes place on these surfaces rather than in the whole anodic volume, with the risk of redistribution mentioned above. If one is able to retain a major proportion of the soluble zinc species within the anodic mass itself, in its volume, the zinc that will be released during charging will be able to form much more easily throughout the whole thickness of the electrode. This is the objective that the authors of the present invention have concerned themselves with, by combining this advantageous characteristic feature with the presence, within the electrode, of dispersed conducting networks principally formed by the presence of conducting ceramic materials according to French patent application FR 2.788.887.

By the end of the work that was carried out it was apparent that the addition of at least one alkali metal titanate of the general formula $(M_2O)_n(TiO_2)_m xH_2O$ in which M denotes Li, Na, K, Rb or Cs, n is between 0.5 and 2, m is between 1 and 10 and x is between 0 and 10, or alkaline earth metal titanate of the general formula $(MO)_n(TiO_2)_m xH_2O$ in which M denotes Mg, Ca, Sr or Ba, n is between 1 and 5, m is between 1 and 10 and x is between 0 and 10, to the active mass, improves the cyclability of the zinc anode if it is combined with conducting ceramic materials and more especially with titanium nitride.

In the present application the various values representing the limits of the ranges of values should be regarded as being between the ranges of values themselves. Furthermore, the term zinc anode is understood to denote an anode whose active mass comprises a minimum quantity of zinc in the form of zinc oxide containing or not an addition of metallic zinc.

Among the most efficient titanates, it should be emphasised that the action with regard to zincates is particularly pronounced if the additive consists, at least in part, of calcium titanate.

According to the present invention it may also be convenient to combine the mixture of conducting ceramic materials/titanates, and more specifically titanium nitride/calcium titanate, with aluminium-based compounds such as calcium aluminate, and/or to add a soluble aluminium compound to the electrolyte, and/or also to add to the anodic active mass a compound which, on contact with the alkaline electrolyte, will form soluble compounds of aluminium. There may be mentioned, by way of non-limiting example, aluminium nitride or double nitrides of titanium and aluminium.

Similarly, it is possible to add to the active mass a quantity of an additive consisting of at least one aluminium-based compound and/or a quantity of an additive consisting of at least one compound forming, on contact with the alkaline electrolyte, soluble compounds of aluminium, in an amount between 1 and 5 wt. % with respect to the zinc oxide.

There may also be added to the electrolyte a quantity of an additive consisting of at least one aluminium compound that is soluble in the electrolyte, in an amount between 1 and 5 wt. % with respect to the zinc oxide.

The double nitrides of titanium and aluminium have the advantage that they lead to the formation of titanium nitride having a highly developed surface whose reactivity is increased with respect to the electrolyte, thereby reinforcing the capacity for fixing zincates.

A close bond has therefore been successfully forged between fixation sites for soluble zinc species and conducting sites for germination of zinc during recharging, within the anodic active mass itself of the porous zinc electrode.

The combined phenomena of fixation of the zincates and germination of the zinc on the multiple conducting sites may be improved further by the addition of bismuth to the active mass (or bismuth oxide, which will be converted into metallic bismuth during the charging), which will reinforce the internal conduction of the electrode.

On the other hand, the authors of the present invention have found that additives comprising silicon, such as for example calcium silicate or calcium aluminosilicate, may seriously interfere with the functioning of the electrode and promote dendritic growths of zinc. It should be emphasised that these results contradict those given in the literature, which suggest to the person skilled in the art the use of calcium silicates, either as absorbent (U.S. Pat. No. 4,312, 931 in particular) or as cement constituent (U.S. Pat. No. 4,332,871).

Preferably the electrolyte according to the invention contains zinc oxide dissolved in the form of zincate ions. In fact, the formation of metallic zinc is in addition promoted during the charging or charging cycle of the generator according to the invention, by the presence of zincate ions in the electrolyte.

The improvement of the ability of zinc electrodes incorporating at least one conducting ceramic material according to the description given in French patent application FR 2.788.887 to undergo cycling, and included by way of reference in the present description, when they are combined with an electrolyte consisting of a highly concentrated alkaline solution and preferably containing solubilised zinc oxide in the form of zincate ions, results not only from an increase in the conducting sites for germination of metallic zinc in the anodic mass but also from the more rapid creation of retention sites for zincates on the surface of the ceramic conducting particles, as soon as the anode comes into contact with the electrolyte, due to the high concentration of $OH^-$ ions in the latter.

DETAILED DESCRIPTION OF THE PREFERRED EMBODIMENT

According to a preferred embodiment, an electrolyte consisting of a highly concentrated alkaline solution is understood to denote a solution of potassium hydroxide or sodium hydroxide whose concentration is between 7 and 15 moles per liter. Preferably the concentration is between 9 and 14 moles per liter and more preferably between 10 and 13 moles per liter. In the present application the various values representing the limits of the ranges of values should be regarded as being included within the ranges of the values themselves. Furthermore, the term zinc anode is understood to denote an anode whose active mass comprises a minimum quantity of zinc in the form of zinc oxide to which is added or not metallic zinc.

Thus, in the generators according to the invention two factors are synergistically involved when an electrolyte is used consisting of a highly concentrated alkaline solution containing or not solubilised zinc oxide, in a system integrating a charged zinc anode in a conducting ceramic material:

the concentration of OH ions the concentration of zincates.

These two factors act in different ways:

the $OH^-$ ions create on the particles of conducting ceramic material, by chemical attack, adsorption sites for zincates, via the formation of slightly crystallised titanates, the corrosion rate of the ceramic material being accelerated by the increase in concentration of OH ions;

the zincates, whose concentration is raised due to the increased solubility of the zinc oxide, in the concentrated potassium hydroxide, will accelerate and reinforce the formation of a conducting network of zinc in the anode, starting from the first cycles of formation of an electrode in which zinc oxide is on the contrary not a conductor.

The use of an electrolyte consisting of a highly concentrated alkaline solution preferably containing solubilised zinc oxide is thus found to be particularly advantageous for producing storage batteries with zinc anodes initially incorporating conducting ceramic materials and possibly titanates such as those described above. This is made possible thanks to the good retention of the zincates within the anodic mass, on the adsorption sites that are formed therein.

This advantage, and the importance of a concentrated electrolyte, are reinforced by the fact that it is desirable to reduce the masses of the various components of the storage battery, including that of the electrolyte, if it is desired to optimise the specific energies. However, the electrolyte used in a storage battery with a zinc anode undergoes variations in concentration of zincates during the charging/discharging cycles, on account of the formation of these zincates during the discharging of the storage battery, and their conversion into metallic zinc during the course of the recharging.

It can be seen that, all other things being equal, simply desirably reducing the volume of electrolyte would lead to a proportional reduction of the quantity of zincate ions that it could contain and thus of the corresponding useful reserve of metallic zinc to be reformed within the anode during the recharging and to be available to form the conducting zinc network mentioned above. On the other hand and advantageously, an increase in the concentration of the electrolyte would allow, for the same volume, the solubility of the zinc oxide and thus the concentration of zincates to be usefully increased.

Thus, if it is possible to accept large excesses of electrolyte for a non-optimised storage battery of the open type, i.e. about 10 to 15 ml/Ah of capacity of the generator, this quantity should be reduced for semi-sealed or sealed storage batteries, and is then generally between about 2 and 10 ml/Ah and preferably between 2 and 5 ml/Ah. The reduction in the volume of electrolyte not only enables the mass and volume energies to be increased, but also promotes the recombination of the gases in the semi-sealed and sealed storage batteries.

In fact, the oxygen formed on the positive nickel electrode at the end of charging should recombine with the metallic zinc of the anode so as to restrict the rise in the internal pressure. The diffusion of oxygen, according to principles that are well known to the person skilled in the art for nickel-cadmium and nickel-metal hydride alkaline storage batteries, is facilitated if the amount of electrolyte is reduced. The same principle applies to nickel-zinc storage batteries involving partial recombination of gas (semi-sealed batteries) and recombination of gas (sealed batteries).

According to the present invention, the zinc anodes are preferably produced according to the production procedures described in French patent application FR 2.788.887.

The invention also provides a zinc anode and a process for the production of the said zinc anode for alkaline secondary electrochemical generators. In the case where the active mass of the zinc anode comprises zinc oxide and at least one conducting ceramic material, there is added to the active mass of the zinc anode an amount of an additive consisting of at least one alkali metal titanate of the general formula $(M_2O)_n(TiO_2)_m xH_2O$ in which M denotes Li, Na, K, Rb or Cs, n is between 0.5 and 2, m is between 1 and 10 and x is between 0 and 10, or alkaline earth metal titanate of the general formula $(MO)_n(TiO_2)_m xH_2O$ in which M denotes Mg, Ca, Sr or Ba, n is between 1 and 5, m is between 1 and 10 and x is between 0 and 10, of between 0.5 and 20% by weight with respect to the zinc oxide.

The zinc anode that is used may advantageously be of the embedded-plasticised electrode type and thus formed by embedding, coating or filling by any means, in the liquid phase or dry phase, a high-porosity three-dimensional support of the cross-linked aveolar metallic foam type, with a paste containing in particular zinc oxide powder, the dispersion of particles of ceramic materials and titanates as described above, a plasticiser, and possibly a suspension agent.

The dispersions of the additives aiding the absorption of the zinc within the anodic active mass is a simple embodiment of the combination within the scope of the present invention. There is then advantageously used fine particles of additives dispersed as homogeneously as possible within the active mass in order to produce a uniform distribution in the mass and thus an always very reduced interspacing between the adsorption sites of the zincates and germination sites of the zinc.

Within the scope of the present invention it may be advantageous to employ a very wide range of means in order to form connections between conducting networks within the electrode and retention additives for zincates in solution.

Among these means there may be mentioned the following:

fixing, by any convenient process, of the particles of retention additive according to the invention on the support/charge collector, this fixing being able to be effected over a more or less large proportion of the developed surface of the latter, and in particular of the meshes of a metallic foam type support, or any other high-porosity three-dimensional metallic or metallised structure;

prior intimate mixture of the particles of ceramic materials, retention additives for zincates, and possibly particles of bismuth or bismuth oxide;

fixing, for example by mechanical-chemical or by combined production—in particular by self-propagating thermal reaction—of the retention additive on the particles themselves of the conducting ceramic material. Thus, in particular when the ceramic material is prepared by self-propagating thermal reaction, it is possible and advantageous to incorporate in the reaction mixture the components that will permit the combined formation of the retention additives of the zincate ions.

Accordingly, there may be used a process for preparing nitrides that is well known to the person skilled in the art, namely the self-propagating thermal reaction (SHS "Self Propagating High Temperature Synthesis"). As described for example in U.S. Pat. No. 4,459,363, this process consists in mixing a nitrogen source, in particular a metallic nitride such as sodium nitride, with at least a stoichiometric amount of a metal oxide such as titanium oxide. The self-propagating thermal reaction is then initiated. The reaction mixture may advantageously be adjusted so as to convert a proportion of the titanium oxide into titanates. Particles of suitable granulometry are thereby obtained, consisting of conducting ceramic materials such as titanium nitride to which are closely joined retention additives for zincate ions, such as alkali metal titanates. The person skilled in the art will easily be able to devise other examples of reaction mixture or type of preparation comprising for example an aluminium-based compound, and to treat the mixture by self-propagating thermal reaction leading to the formation of particles whose composition and structure will be perfectly suited to the implementation of the present invention. Consequently, according to a preferred embodiment the retention additive for the zincates, such as titanates, will be fixed to the particles of conducting ceramic materials. This fixing stage may be carried out during the joint production of the additive and of the ceramic material or materials by a self-propagating thermal reaction.

Two advantageous embodiments that enable the importance of the present invention to be assessed are given hereinafter by way of non-limiting illustration of the said invention.

EXAMPLE 1

Three categories of zinc anodes, namely A1, A2, A3, all of the embedded-plasticised type, are produced. The active masses are prepared in the form of pastes of the following compositions:

|  | Anodes A1 | Anodes A2 | Anodes A3 |
|---|---|---|---|
| Active material | ZnO powder | ZnO powder | ZnO powder |
| Metallic zinc | 5%[1] | 5%[1] | 5%[1] |
| Titanium nitride[2] | 18%[3] | 15%[3] | 10%[3] |
| Calcium titanate | — | 2.5%[3] | 1.25% |
| Calcium aluminate | — | 2%[3] | 3%[3] |
| Bismuth oxide | 5%[1] | 5%[1] | 5%[1] |
| Nickel hydroxide | 5%[1] | 5%[1] | 5%[1] |
| Plasticiser | P.T.F.E.[4] | P.T.F.E.[4] | P.T.F.E.[4] |
| Suspension agent | Water | water | water |
| Support: crosslinked foam[5] (initial thickness 2 mm) | Cu + Pb, 45 PPI 550 g/m$^2$ | Cu + Pb, 45 PPI 550 g/m$^2$ | Cu, 45 PPI 400 g/m$^2$ |

[1] by weight with respect to the zinc oxide
[2] mean grain size 3 μm
[3] by weight with respect to the active mass
[4] added in the form of a 60% aqueous suspension, the concentration of PTFE being adjusted to 4% by weight with respect to the zinc oxide
[5] the "45 PPI" grade corresponds to about 18 surface pores per linear centimeter The supports/collectors of the electrodes A1 and A2 are of copper coated with a protective layer of lead, and the supports of the electrode A3 are of copper not coated with this protective layer.

The solid particles are subjected to a powerful kneading before the addition of water, in order to obtain an intimate and homogeneous mixture.

After introducing the active mass into the interior of the metallic support, the active mass is dried, and the electrode thus formed is compacted under a compaction pressure of 80 kg per cm$^2$. The thickness of the electrode is adjusted to 0.8 mm. The electrodes have a nominal unit capacity of 1 Ah.

The electrolyte is potassium hydroxide, KOH, in a concentration of 7 N. The electrolyte is saturated with zincates, without additives.

Banks of open nickel-zinc storage batteries are formed by joining two nickel cathodes to one zinc anode so that only the latter defines the capacity of the storage battery and so that its own characteristics can be monitored during the tests.

A combination of two separators between the electrodes of opposite polarities is used. One is a microporous membrane such as that marketed under the trade mark "Celgard" by Hoescht Celanese. The other is a nonwoven separator of polyamide or polypropylene, such as the reference product "FS 2115" from the Carl Freudenberg company.

The storage batteries that are thus formed are subjected to long-duration cycling tests according to standard procedures. The type of charging-discharging cycles involving imposed current is as follows: C/4 régime (charging as well as discharging carried out every 4 hours, the applied current corresponding to one quarter of the nominal capacity of the unit), with a level of discharge of about 80%; one cycle comprising a total discharge (100% level of discharge) is carried out every ten cycles.

The electrodes of type A1 retain more than 80% of their nominal capacity over 300 to 500 cycles according to the standard protocols, before their capacity falls very quickly.

The electrodes of types A2 and A3 retained more than 80% of their nominal capacity over almost 1500 cycles, and exceeded 2000 cycles with a capacity greater than 70% of their nominal capacity.

EXAMPLE 2

Nickel-zinc storage batteries comprising zinc anodes of type A2 are formed as described above in Example 1, but without the addition of metallic zinc.

Three sets of nickel-zinc storage batteries are made by assembling, for each one, 7 nickel electrodes and 8 zinc electrodes. The nickel electrodes have a capacity lower than that of the zinc electrodes, and define the capacity of the storage battery, which is 30 Ah.

A combination of two separators between the electrodes of opposite polarities is used. One is a microporous membrane, such as that marketed under the trade mark "Celgard" by Hoescht Celanese. The other is a nonwoven separator of polyamide or polypropylene, such as the reference product "FS 2115" from the Carl Freudenberg company.

The covers of the storage batteries are provided with a valve that opens at low pressure, i.e. at a pressure of about 0.2 bar.

In contrast to Example 1, two electrolytes of different concentrations are employed:
a 7 N potassium hydroxide solution saturated with zinc oxide (electrolyte A),
a 12 N potassium hydroxide solution saturated with zinc oxide (electrolyte B).

The first set of storage batteries is filled with electrolyte of type A, in an amount of 300 ml per cell. The second set is also filled with electrolyte of type A, but in an amount of 150 ml per cell. Finally, the third set is filled with electrolyte of type B in an amount of 150 ml per cell.

The storage batteries thus formed are subjected to long duration cycling tests according to standardised procedures. The type of charging/discharging cycles, under imposed current, is as follows: C/4 regime (charging as well as discharging carried out every 4 hours, the applied current corresponding to a quarter of the nominal capacity of the unit), with a level of discharge of about 80%; one cycle comprising a total discharge (100% level of discharge) is carried out every 50 cycles.

The first set of storage batteries retains more than 80% of the initial capacity for almost 800 cycles.

The second set of storage batteries retains more than 80% of the initial capacity for almost 400 cycles, before the capacity falls rapidly.

The third set of storage batteries retains more than 80% of the initial capacity for almost 1200 cycles.

The first set of storage batteries has an acceptable cycling duration, but is 25% heavier compared to the storage batteries of the second and third sets.

The effect of the reduction of the electrolyte volume is particularly marked as regards the cyclability of the storage batteries of the second set.

The storage batteries of the third set, containing a highly concentrated electrolyte although in a reduced amount, have the best characteristics in terms of cyclability and mass energy.

It has been shown within the scope of the present invention that the very high levels of performance achieved with the latter could be due to the addition of amounts of titanates as defined, of between 0.5 and 20% by weight with respect to the zinc oxide, and preferably 1 to 5% by weight with respect to the zinc oxide. Advantageously the amount of soluble aluminium-based compounds in the electrolyte and/or of compounds forming, in contact with the alkaline electrolyte, soluble compounds of aluminium is between 1 and 5% by weight with respect to the zinc oxide.

It should also be noted, without going beyond the scope of the invention, that the retention additives for zincates may consist of a combination of at least two compounds of types comprising aluminates, titanates and alumino-titanates of barium, calcium, lithium, magnesium, potassium, sodium or strontium.

Finally, as follows from one of the embodiments described by way of example, it has been verified within the scope of the invention that it is perfectly possible to use a support/charge collector, in particular of the crosslinked aveolar foam type made of copper, without necessarily having to coat the latter with a protective layer of a metal or alloy with a high hydrogen overvoltage, intended to prevent a corrosion of the said support.

It has also been shown within the scope of the present invention that the very high performance levels that are achieved were due to the use of a highly concentrated alkaline solution in combination with zinc electrodes containing conducting ceramic materials, such as described in French patent FR 2.788.887, and appropriate additives such as described in the present invention.

The use of highly concentrated potassium hydroxide containing or not solubilised zinc oxide enables in particular storage batteries with zinc anodes to be produced that provide non-degraded mass energies while satisfying the cyclability criteria compatible with a commercial application.

Without going beyond the scope of the present invention, it is possible to implement the invention by combining with it all or some of the additives or charging procedures described in the literature and applied to the use of zinc electrodes.

Of course, and as also follows in large part from the preceding description, the invention is not restricted to the specific embodiments that have been described by way of example. The invention is not restricted to the examples that have been given, but covers all variants thereof.

The invention claimed is:

1. Alkaline secondary electrochemical generators with zinc anodes, the active mass of which comprises at least one conducting ceramic material, an additive including at least one insulating alkali metal titanate of the general formula $(M_2O)_n(TiO_2)_m xH_2O$ in which M denotes Li, Na, K, Rb or Cs, n is between 0.5 and 2, m is between 1 and 10 and x is between 0 and 10, or an insulating alkaline earth metal titanate of the general formula $(MO)_n(TiO_2)_m xH_2O$ in which M denotes Mg, Ca, Sr or Ba, n is between 1 and 5, m is between 1 and 10 and x is between 0 and 10, wherein an electrolyte of the generator includes a highly concentrated alkaline solution and the active mass of the zinc anode contains an aluminium-based compound.

2. Alkaline secondary electrochemical generators with zinc anodes according to claim 1, wherein the highly concentrated alkaline solution is a solution of potassium hydroxide or sodium hydroxide whose concentration is between 7 and 15 moles per liter.

3. Alkaline secondary electrochemical generators with zinc anodes according to claim 1, wherein the electrolyte further includes zinc oxide solubilized under the form of zincate.

4. Alkaline secondary electrochemical generators with zinc anodes according to one of claim 1, wherein the anode is a plastic bonded zinc electrode using a support and charge collector made of a metallic foam.

5. Alkaline secondary electrochemical generators with zinc anodes according to claim 1, wherein the aluminium based compound is soluble in the electrolyte and is selected from a group consisting of titanium aluminium nitride and aluminium nitride.

6. Alkaline secondary electrochemical generators with zinc anodes according to claim 5, wherein the active mass of the zinc anode comprises zinc oxide, and wherein the amount of the aluminium-based compound soluble in the electrolyte is between 1 and 5% by weight with respect to the zinc oxide.

7. Alkaline secondary electrochemical generators with zinc anodes according to claim 1, wherein the additive is calcium titanate corresponding to the formula $(CaO)_n(TiO_2)_m xH_2O$ where n equal 1, m equal 1 and x is between 0 and 10.

8. Alkaline secondary electrochemical generators with zinc anodes according to claim 7, wherein the active mass of the zinc anode comprises zinc oxide, and wherein the amount of calcium titanate is between 0.5 and 20% by weight with respect to the zinc oxide.

9. Alkaline secondary electrochemical generators with zinc anodes according to claim 7, wherein the calcium titanate is in the form of fine particles dispersed in the active mass.

10. Alkaline secondary electrochemical generators with zinc anodes according to claim 1, wherein the aluminium-based compound is fixed on particles of the conducting ceramic material.

11. Alkaline secondary electrochemical generators with zinc anodes according to claim 1, wherein the aluminium-based compound includes calcium aluminate.

12. Alkaline secondary electrochemical generators with zinc anodes according to claim 1, wherein the active mass of the zinc anode contains bismuth or bismuth oxide.

13. Alkaline secondary electrochemical generators with zinc anodes according to claim 1, wherein the additive is fixed on particles of the conducting ceramic material.

14. Zinc anode for alkaline secondary electrochemical generators, an active mass of the zinc anode comprising at least one conducting ceramic material, wherein the active mass of the zinc anode contains an additive consisting of a combination of at least two compounds of the type comprising aluminates and insulating alkali metal titanates of the general formula $(M_2O)_n(TiO_2)_m xH_2O$ in which M denotes Li, Na, K, Rb or Cs, n is between 0.5 and 2, m is between 1 and 10 and x is between 0 and 10, or a combination of at least two compounds of the type comprising aluminates and insulating alkali metal titanates of the general formula $(MO)_n(TiO_2)_m xH_2O$ in which M denotes Mg, Ca, Sr or Ba, n is between 1 and 5, m is between 1 and 10 and x is between 0 and 10, or alumino-titanates of barium, calcium, lithium, magnesium, potassium, sodium or strontium.

15. Zinc anode for alkaline secondary electrochemical generators according to claim 14, wherein the additive is calcium titanate.

16. Zinc anode for alkaline secondary electrochemical generators according to claim 14, the active mass of the zinc anode comprising zinc oxide, wherein the amount of additive is between 0.5 and 20% by weight with respect to the zinc oxide.

17. Zinc anode for alkaline secondary electrochemical generators according to claim 14, wherein the additive is in the form of fine particles dispersed in the active mass.

18. Zinc anode for alkaline secondary electrochemical generators according to claim 14, wherein the additive is fixed to the particles of said conducting ceramic material.

19. Zinc anode for alkaline secondary electrochemical generators according to claim 14, wherein the active mass of the zinc anode contains bismuth or bismuth oxide.

20. Zinc anode for alkaline secondary electrochemical generators according to claim 14, wherein the active mass of the zinc anode contains an aluminum-based compound selected from the group consisting of titanium aluminum nitride and aluminum nitride.

21. Zinc anode for alkaline secondary electrochemical generators comprising an alkaline electrolyte, an active mass of which comprises at least one conducting ceramic material, an additive including at least one insulating alkali metal titanate of the general formula $(M_2O)_n(TiO_2)_m xH_2O$ in which M denotes Li, Na, K, Rb or Cs, n is between 0.5 and 2, m is between 1 and 10 and x is between 0 and 10, or insulating alkaline earth metal titanate of the general formula $(MO)_n(TiO_2)_m xH_2O$ in which M denotes Mg, Ca, Sr or Ba, n is between 1 and 5, m is between 1 and 10 and x is between 0 and 10, wherein a, dispersion of particles of conducting ceramic materials and titanates contains an additive consisting of at least one aluminium-based compound.

22. Zinc anode for alkaline secondary electrochemical generators according to claim 21, wherein the aluminium-based compound includes calcium aluminate.

23. Zinc anode for alkaline secondary electrochemical generators according to claim 21, the active mass of the zinc anode comprising zinc oxide, wherein the amount of aluminium-based compounds and/or of compounds forming, on contact with the alkaline electrolyte, soluble compounds of aluminium, is between 1 and 5% by weight with respect to the zinc oxide.

24. Process for the production of a zinc anode for alkaline secondary electrochemical generators, the active mass of the zinc anode comprising zinc oxide and at least one conducting ceramic material in the form of particles of conducting ceramic material, comprising the step of adding to the active mass of the zinc anode an amount of an additive consisting of at least one insulating alkali metal titanate of the general formula $(M_2O)_n(TiO_2)_m xH_2O$ in which M denotes Li, Na, K, Rb or Cs, n is between 0.5 and 2, m is between 1 and 10 and x is between 0 and 10, or insulating alkaline earth metal titanate of the general formula $(MO)_n(TiO_2)_m xH_2O$ in which M denotes Mg, Ca, Sr or Ba, n is between 1 and 5, m is between 1 and 10 and x is between 0 and 10, of between 0.5 and 20% by weight with respect to the zinc oxide.

25. Production process according to claim 24, wherein the additive is fixed on the particles of conducting ceramic material.

26. Production process according to claim 24, wherein the additive is fixed on the particles of conducting ceramic material during the joint production of the additive and of the ceramic material by a self-propagating thermal reaction.

* * * * *